(12) United States Patent
Marya et al.

(10) Patent No.: US 11,002,701 B2
(45) Date of Patent: May 11, 2021

(54) ELECTRICALLY SMART MULTI-LAYERED COATING FOR CONDITION-BASE MONITORING

(71) Applicant: Cameron International Corporation, Houston, TX (US)

(72) Inventors: Manuel Marya, Sugar Land, TX (US); Ronald Manson, Spring, TX (US); Christian Meade, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 16/183,324

(22) Filed: Nov. 7, 2018

(65) Prior Publication Data

US 2020/0141890 A1 May 7, 2020

(51) Int. Cl.
*G01N 27/20* (2006.01)
*E21B 41/00* (2006.01)
*E21B 47/00* (2012.01)

(52) U.S. Cl.
CPC ............. *G01N 27/20* (2013.01); *E21B 41/00* (2013.01); *E21B 47/00* (2013.01)

(58) Field of Classification Search
CPC .......... G01N 27/20; E21B 41/00; E21B 47/00
See application file for complete search history.

(56) References Cited

U.S. PATENT DOCUMENTS

2002/0192511 A1* 12/2002 Hruschka ............... C04B 28/34
 428/704
2005/0063827 A1* 3/2005 Ochiai ..................... F01D 5/288
 416/241 R
2005/0158511 A1* 7/2005 Sabol ...................... F23R 3/007
 428/131
2008/0124469 A1* 5/2008 Eichmann ............... C23C 26/00
 427/348
2008/0236842 A1* 10/2008 Bhavsar ................... E21B 41/02
 166/381

(Continued)

FOREIGN PATENT DOCUMENTS

WO 2014130919 A1 8/2014

OTHER PUBLICATIONS

Slide Share, "3D printing of multilayer coating," Presented by Sara Pakseresht, Aug. 1, 2016 retrieved on Nov. 2, 2018 at https://www.slideshare.net/sarairani123/3-d-printing-of-multilayer-coating (29 pages).

(Continued)

*Primary Examiner* — Daniel R Miller
(74) *Attorney, Agent, or Firm* — Jaime Castano

(57) ABSTRACT

The disclosure provides for apparatus, including coated parts, where a base material of the part is coated with a multilayer coating. The multilayer coating includes at least three layers, including at least two electrically conductive layers. Also provided is a method for making apparatus, which includes providing a part and applying a multilayer coating to the base material of the part. Further provided is a method of monitoring and diagnosing a condition of a coated part. The method includes providing a coated part having a multilayer coating on a base material, measuring an electrical response of the multilayer coating, and correlating the electrical response with a condition of the multilayer coating.

20 Claims, 13 Drawing Sheets

(56) References Cited

U.S. PATENT DOCUMENTS

| | | | |
|---|---|---|---|
| 2008/0302564 A1* | 12/2008 | Olson | H05K 1/056 174/268 |
| 2009/0219040 A1* | 9/2009 | Shinde | F01D 17/02 324/693 |
| 2015/0176718 A1 | 6/2015 | Danchun et al. | |

OTHER PUBLICATIONS

Khelifa, et al., "A multilayer coating with optimized properties for corrosion protection of Al," Journal of Materials Chemistry A, Issue 31, Jun. 23, 2015, Abstract, retrieved on Nov. 2, 2018 at https://pubs.rsc.org/en/content/articlelanding/2015/ta/c5ta01920f#!divAbstract (5 pages).

* cited by examiner

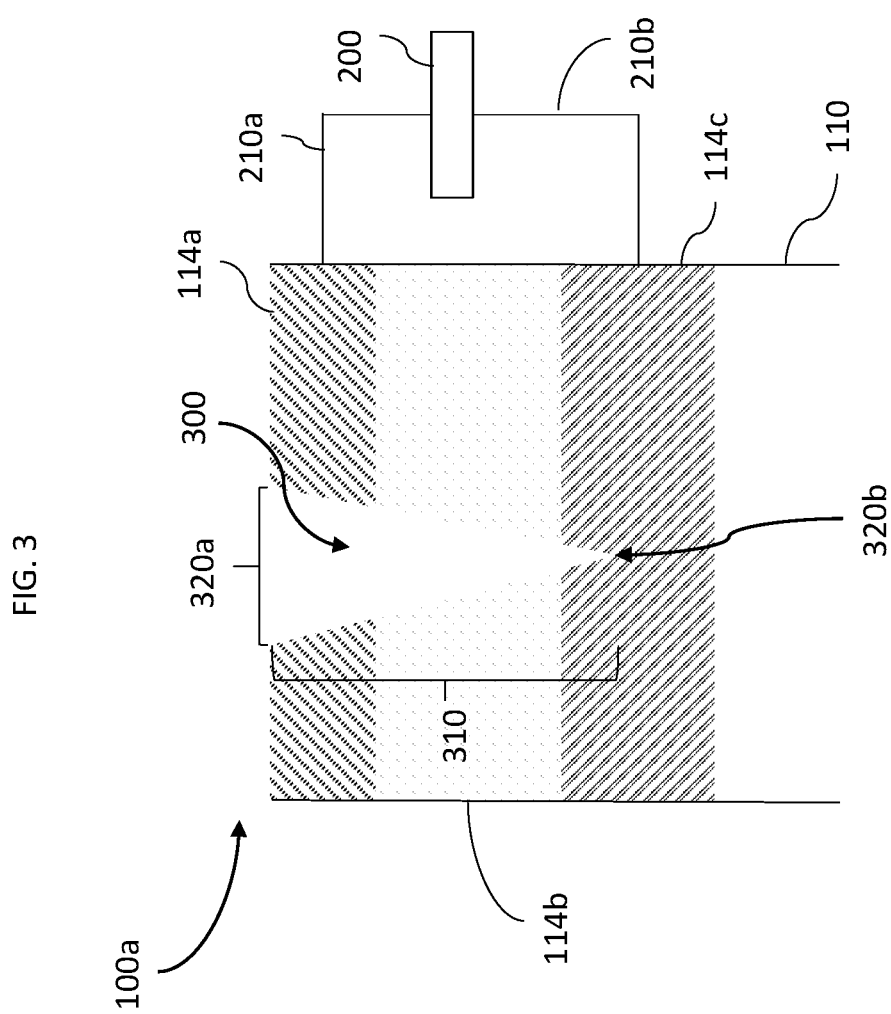

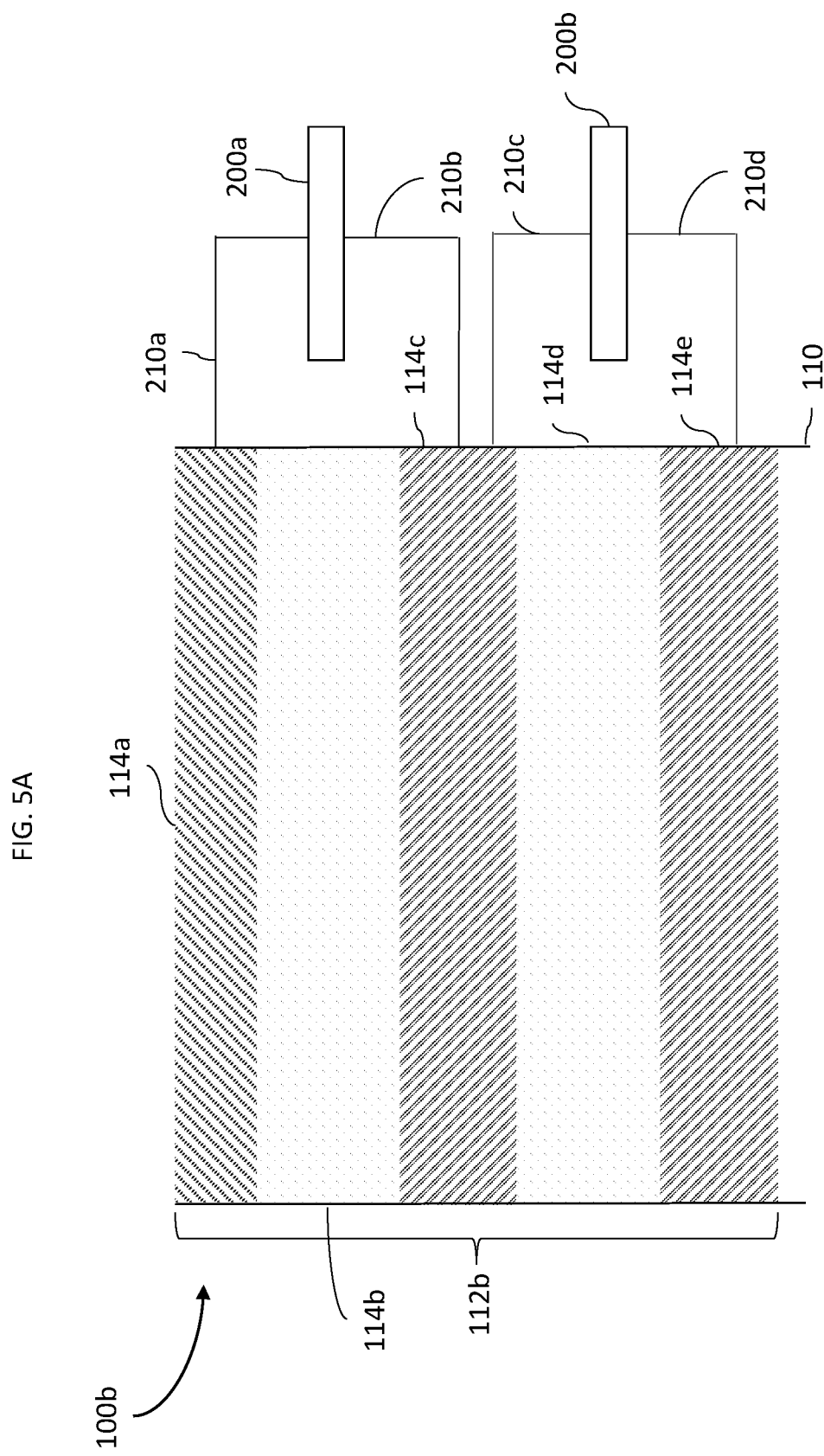

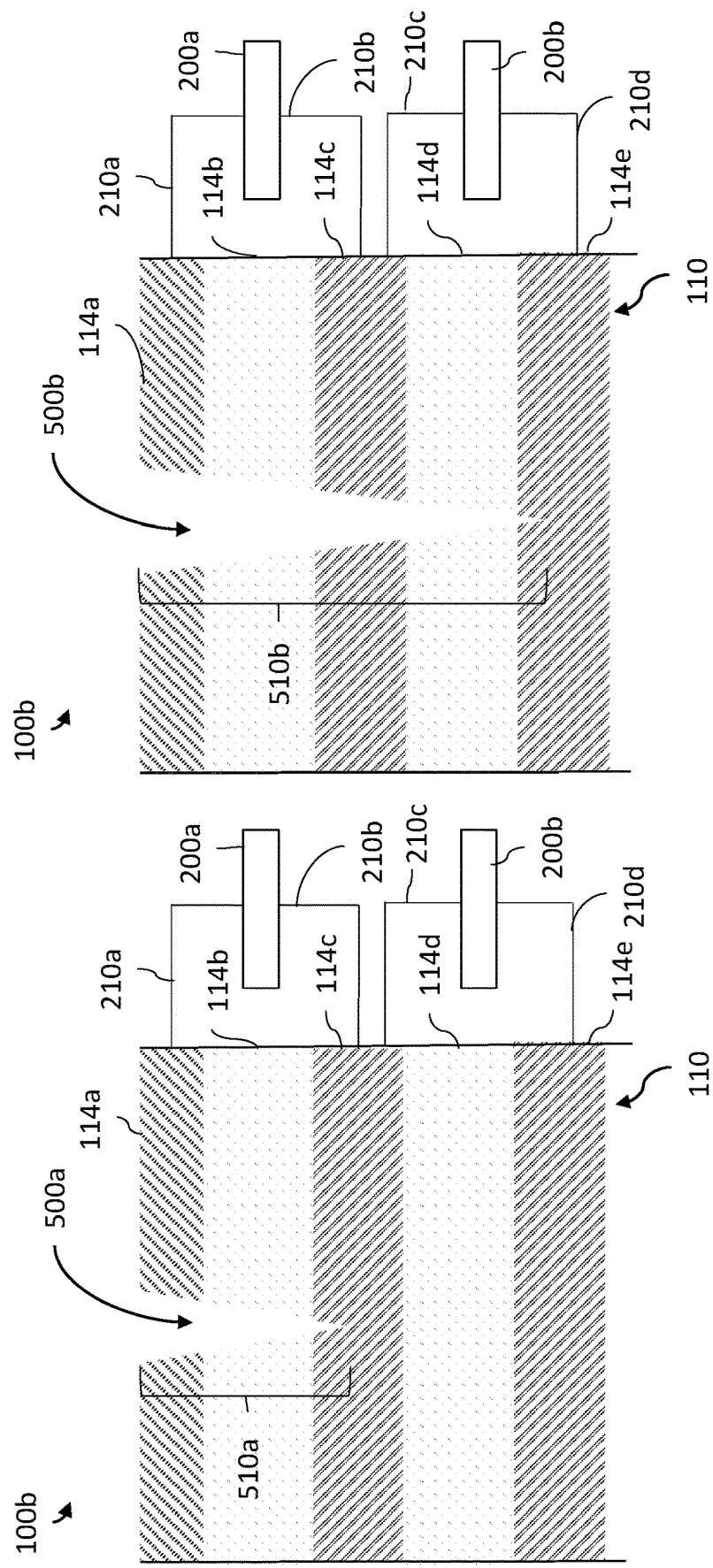

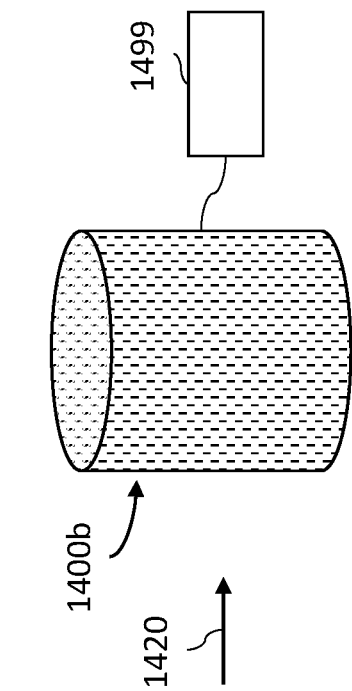
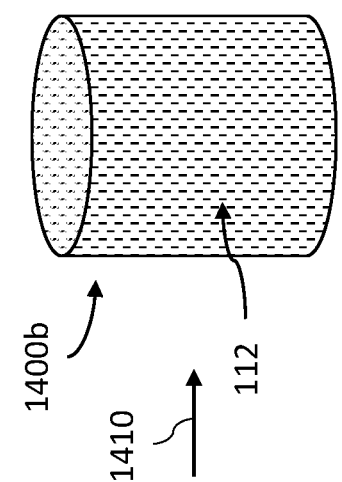
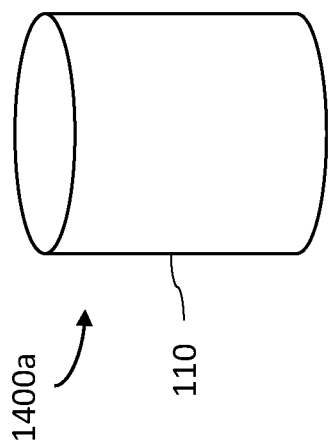
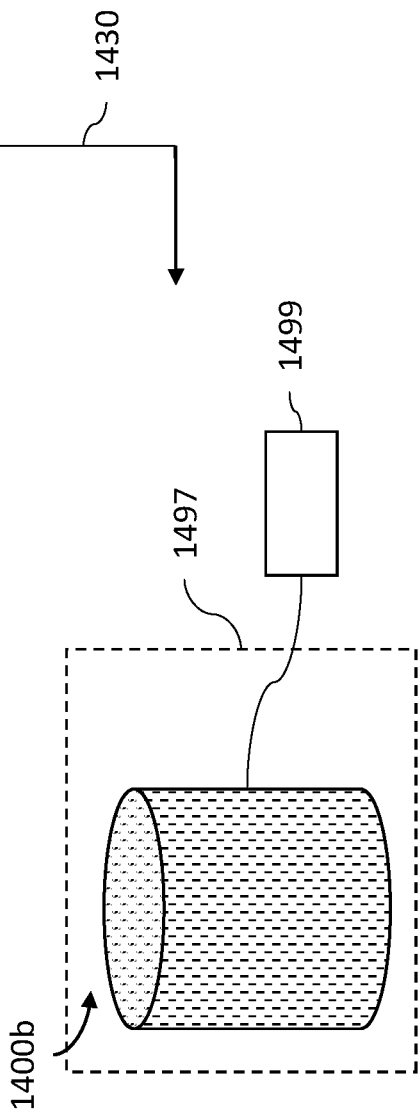

US 11,002,701 B2

ELECTRICALLY SMART MULTI-LAYERED COATING FOR CONDITION-BASE MONITORING

FIELD

The present disclosure relates to electrically smart multi-layered materials, including coatings, for condition-base monitoring; to methods of making and using the same; to apparatus and systems including the same; and to methods of making and using such apparatus and systems.

BACKGROUND

Many oilfield parts exhibit wear or other forms of degradation over extended periods of use. For example, flow control apparatus used in oil & gas exploration, drilling and production, such as valves (e.g., ball valves and gate valves), are typically subjected to abrasive wear and high temperatures during use, which negatively impacts the parts total cost of ownership (TCO). Additionally, for many such parts, the condition of the part is not known during operation of the part, such that failure of the part may occur without advance warning and operations of the part must be ceased for inspection.

So called "smart coatings", while still largely conceptual, are a major research and development area in many high-tech industries. For example, multi-layered coatings that are designed to provide multiple different functionalities, such as "self-healing", have been proposed. Some so called "smart valves" often utilize plug-in sensors for data collection.

BRIEF SUMMARY

One aspect of the present disclosure includes an apparatus. The apparatus includes a part, including a base material. A multilayer coating is applied on the base material. The multilayer coating is an at least three-layer coating that includes at least two electrically conductive layers.

Another aspect of the present disclosure includes a method for making an apparatus. The method includes providing a part, the part including a base material. The method includes applying a multilayer coating to at least a portion of the base material. The multilayer coating is an at least three-layer coating that includes at least two electrically conductive layers.

Another aspect of the present disclosure includes a method of monitoring and diagnosing a condition of a coated part. The method includes providing a coated part, the coated part including a base material having a multilayer coating thereon. The multilayer coating is an at least three-layer coating that includes at least two electrically conductive layers. The method includes measuring an electrical response of the multilayer coating, and correlating the measured electrical response with a condition of the multilayer coating.

BRIEF DESCRIPTION OF THE DRAWINGS

So that the manner in which the features of the compositions, articles, systems and methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 3 depicts a part having a three-layer coating electrically coupled with a voltage meter for passive mode monitoring of the part, with a scratch extending at least partially through the coating.

FIG. 5A depicts a part having a five-layer coating electrically coupled with two voltage meters for passive mode monitoring of the part.

FIG. 5B depicts the part of FIG. 5A with a relatively shallow scratch extending at least partially through the coating.

FIG. 5C depicts the part of FIG. 5A with the scratch now extending relatively deeply through the coating.

FIG. 13A depicts an uncoated part.

FIG. 13B depicts the part of FIG. 13A after coating.

FIG. 13C depicts the part of FIG. 13B after electrically coupling the part with electrical monitoring equipment.

FIG. 13D depicts the part of FIG. 13C after deploying the part in an operational environment.

Compositions, articles, systems, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

The present disclosure provides for electrically responsive materials, including coatings; to methods of making and using such materials; to apparatus, systems and parts including the materials; to methods of making and using the apparatus, systems, and parts; and to methods of monitoring and diagnosing apparatus, systems and parts that include the materials.

Coating

Certain aspects of the present disclosure include electrically responsive materials, such as coatings. Such materials may be incorporated on or into (e.g., applied to or coated on) any of various parts, such as oilfield parts to provide for condition-base monitoring thereof. While discussed herein in relation to "parts", the materials disclosed herein may be applied to any of various apparatus and systems, regardless of whether such apparatus and systems are considered or generally referred to as a "part". The electrical response of such materials is indicative of at least one condition or status of the part.

Figure 1:
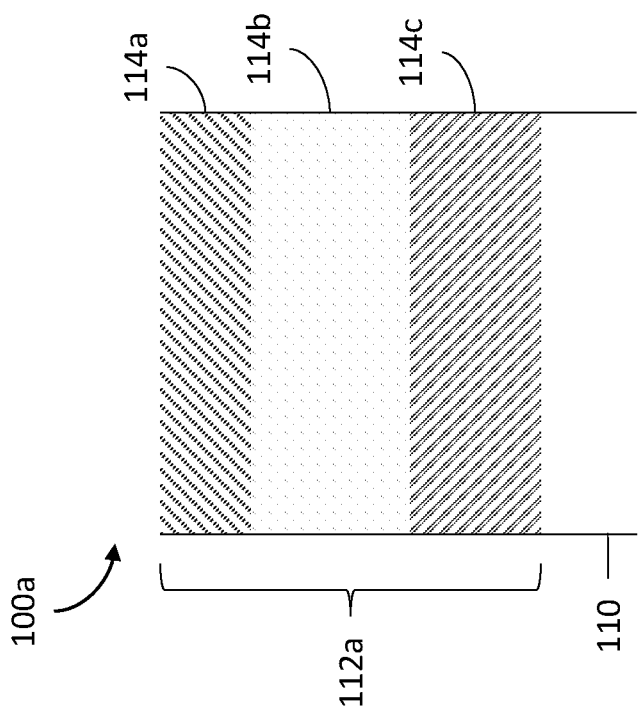
FIG. 1 depicts a part having a three-layer coating.

With reference to FIG. 1, coated part 100a is depicted. Coated part 100a includes base material 110. Base material 110 is a material that the part is composed of in the absence of coating 112a (e.g., prior to part being coated to form coated part 100a). For example, and without limitation, base material 110 may be a carbon or low-alloy steel, stainless steel, or nickel-alloy, or another material. While base material 110 is shown and described as a single-layer material composed of a single material, such as a low-alloy steel, one skilled in the art would understand that such parts are not necessarily composed of a single material. For example, base material 110 may be a coated material (e.g., nickel-plated steel), a composite material (e.g., ceramic particulate with alloy binder, such as cermets), or any of various materials as would be understood by those skilled in the art.

Coating 112a is applied to an outer surface of base material 110 (i.e., the surface of the part that is typically exposed to wear during operations.) Coating 112a is a multilayer coating. In some aspects, coating 112a includes at least three layers, as is shown in FIG. 1. However, coating 112a may include other numbers of layers, such as five layers or more. In FIG. 1, coating 112a is a three-layer coating, including first layer 114a, second layer 114b, and third layer 114c. Third layer 114c is the innermost layer of coating 112a and is in contact with base material 110. First layer 114a is the outermost layer of coating 112a and is exposed. For example, first layer 114a may form the outer surface of part that is exposed to wear during operations. Second layer 114b is sandwiched between first layer 114a and third layer 114c. As shown in FIG. 1, uppermost, first layer 114 is the thinnest of layers 114a-114c and second layer 114b is the thickest of layers 114a-114c. However, one skilled in the art would understand that coating 112a is not limited to this particular arrangement. The thickness of coating 112a may vary depending upon the particular application, the number of layers, and the materials of each layer. As an example, and without limitation, coating 112a may have a thickness (as measured from the bottom of innermost layer 114c to the exposed top of uppermost layer 114a) ranging from 1 mil to 100 mils, or 2 to 50 mils, or 3 to 30 mils, or 4 to 20 mils, or 5 to 10 mils. In certain aspects, coating 112a has a thickness that is equal to or greater than 6 mils. Additionally, as an example, and without limitation, each layer 114a-114c of coating 112a may have a thickness ranging from 0.5 mils to 50 mils, or 1 to 25 mils, or 1.5 to 15 mils, or 2 to 10 mils, or 2.5 to 5 mils.

In certain aspects, the layers of coating 112a sequentially alternate between electrically conductive layers and electrically non-conductive layers. In some such aspects, the outermost layer (i.e., the layer furthest from base material 110 and exposed) is a conductive layer. For example, in FIG. 1, first layer 114a and third layer 114c are or include electrically conductive materials, and second layer 114b is or includes an electrically non-conductive (electrically insulative) layer.

Electrically Conductive Layers

Each of the electrically conductive layers of the multiple layers may be composed of the same material or different materials. In certain aspects, the electrically conductive materials suitable for use in the coatings of the present disclosure are hard and lubricious materials. In certain aspects, at least one or all of the electrically conductive layers (or the material thereof) exhibits a hardness ranging from 450 to 1500 Hardness Vickers Number (HVN), or from 475 to 1250 HVN, or from 500 to 750 HVN, or from 525 to 700 HVN. As would be understood by one skilled in the art, HVN may be determined in accordance with ASTM E384 or ISO 6507-1. In some aspects, one or more of the electrically conductive layers suitable for use in the coatings of the present disclosure are entirely or predominately metallic (pure or alloy), such as Ni or an alloy thereof. For example, the electrically conductive layers may be at least 50% metallic, at least 60% metallic, at least 70% metallic, at least 80% metallic, at least 90% metallic, at least 95% metallic, at least 99% metallic, or 100% metallic by weight. In some such aspects, where an electrically conductive layer is not entirely metallic, the electrically conductive layer may be composed of a composite material, such as a metal matrix composite. At least one or all of the electrically conductive layers (or the material thereof) may be corrosion resistant as determined using standard electrode potential in excess of −300 mV in synthetic seawater at 10° C. The electrically conductive layers of the coating may be formed and/or applied onto the base material and/or onto another layer of the coating via various methods including, but not limited to, electroplating, electroless plating, thermal spray processes including cold spray, chemical vapor deposition (CVD), physical vapor deposition (PVD), and hybrid processes. Some exemplary methods of applying the electrically conductive layers of the coating include electroless nickel plating and thermal spraying of tungsten carbide.

Some exemplary conductive layers include nickel electroplated or pulse electroplated layers of Ni—B, Ni—P, Ni—W, Ni—Co, or Ni—Co—P; electroless nickel plated layers of Ni—P; or thermal sprayed hard facing alloys of Ni—Cr—C—B—Si or Co—Cr—C—B—Si, such as COL-MONOY™. In certain aspects, the conductive layer exhibits an HVN of no more than 1500 HVN. In certain aspects, the top, uppermost layer of the coating is a conductive layer. In some such aspects, upon the occurrence of a breach in the coating (i.e., the occurrence of damage to the coating) the breach is sensed, optionally immediately sensed, because the top, uppermost layer of the coating is a conductive layer that is positioned to sense the occurrence of damage.

Electrically Non-Conductive Layers

In some aspects, the non-conductive layers of the coating, or materials thereof, may be or include ceramic, polymer, ceramic-polymer composites, or ceramic-metal composites. In the ceramic-metal composites, the metal may be the discontinuous phase, with the ceramic forming the continuous phase. The electrically non-conductive layers of the coating may be formed and/or applied onto the base material and/or onto another layer of the coating via different methods including, but not limited to, spraying, including air spray, gas spray, thermal spraying; electrophoretic deposition or electrostatic fluidized processes, sol-gel processes; CVD, and PVD, and hybrid processes.

Thus, in some aspects, the present disclosure provides for multilayer coating formulations and multilayer coating constructions (stacks of layers), including functional wear-resistant coatings. The coatings disclosed herein may be applied to a base part or base material, and may form an integral portion of the part (e.g., a valve or other component). In some such aspects, the coatings disclosed herein form a "skin" or outermost layer on a part (e.g., oilfield part). In certain aspects, the coating includes at least three intermittent electrically conductive and electrically non-conductive layers. In some aspects, the outermost (i.e., uppermost, top layer) is the most electrically conductive of the layers of the coating. The electrical conductivity of the conductive layers may progressively decrease moving from the outermost to the innermost layers of the coating. While shown and described as a "coating", the materials disclosed herein are not limited to being in the form of a coating. The materials may have other forms or constructions where multiple portions of different materials (e.g., conductive materials and non-conductive materials) are arranged to be isolated, separated, and/or segregated into zones, layers, or segments.

Some exemplary non-conductive layers of high dielectric strength include ceramic-like layers including oxides, such as silica oxide, zirconia oxide, and alumina oxide; ceramic-reinforced polymers, including resins having ceramic particles loaded therein, such as phenolic or other resins, enamel-type resins; and polymers, such epoxy polymers, epoxy-phenolic polymers, nylon, polyether ether ketone (PEEK), and polyphenylene sulfide (PPS). In certain aspects, the non-conductive layers are composite based material that are engineered to provide a high-level of mechanical support and adhesion to the conductive coatings or layers. In some such aspects, the non-conductive layers or coatings include a hard ceramic or polymer-ceramic composite coating or layer.

Electrical Measurements

In certain aspects of the present disclosure, the coatings disclosed herein are electrically responsive to the condition of the coating, for condition-base monitoring of the coating and part. Thus, the present disclosure provides for parts having self-detecting functionality integrally built into the part. In such aspects, electrical measurements, such as voltage and current measurements, provide for the collection of data that is responsive to and indicative of conditions of the coating. For example, certain electrical measurements or signals may be responsive to and indicative of the occurrence of and/or presence of defects (surface defects) in the coating, including: scratches in the coating; pits in the coating; crevices in the coating; cracks (e.g., overload cracks, fatigue cracks, stress corrosion cracks) in the coating; abrasive wear in the coating; erosion in the coating; fretting in the coating; debonding in the coating (e.g., in between layers due to lack adhesion, including blistering), porosity or holidays (degassing post-application or during operation); other penetrations, damage, or failures in the coating; or combinations thereof. As such, the status (i.e., whether or not such defects are present) of the coating and/or part may be monitored before, during, and after use of the part in operations. Thus, by monitoring the electrical properties of the coating: the occurrence of and presence of defects in a part may be monitored; the extent of defects in a part (e.g., depth of penetration into the coating) may be monitored; the amount of and/or frequency of defects that have occurred in a part may be monitored; or combinations thereof.

The data that is collected by monitoring the electrical properties and/or response of the coating includes structural "health" data that is indicative of the status of the coating and/or part. For example, such data may be used to assess whether or not the coating and/or part has failed or is approaching failure and is not suitable for service. Thus, in some aspects, the present disclosure provides for methods of extracting data and information from the coating and assessing the status or structural "health" of the coating and/or part, including assessing whether or not the coating and/or part needs to be maintained or replaced.

In some aspects, in order to assess the depth at which defects have penetrated a coating and/or part, assess the quantity and frequency of defects that have occurred to a coating and/or part, or combinations thereof, voltage (e.g., the difference in electrical potentials) is monitored. The voltage may be passively monitored (passive mode) where changes in voltage in the coating are monitored, actively monitored (active mode) where one or more voltages are applied to the coating, or combinations thereof. In some such aspects, the passive and active modes of voltage monitoring are complementary. For passive mode monitoring, the coatings disclosed herein are electrically coupled with a voltmeter. For active mode monitoring, the coatings disclosed herein are electrically coupled with an ammeter and a variable voltage source. The coatings disclosed herein may or may not have significant capacitance, which may influence the voltage and current response of the coatings.

Thus, in certain aspects the present disclosure provides for an apparatus or assembly that includes a coating that is electrically coupled to a source of electrical potential, a current measuring apparatus, or combinations thereof. In some such aspects, the apparatus or assembly is used to measure a voltage, current, or combinations thereof, and provide data regarding the condition of the coating (structural integrity or "health" data). The data regarding the condition of the coating may include, but is not limited to, whether a defect is forming in the coating, whether a defect is present in the coating, the depth of penetration of a defect in or into the coating, or combinations thereof. Thus, in certain aspects the present disclosure provides for methods of monitoring the structural condition of coatings on parts. The methods may include measuring the voltage, current, or combinations thereof across or through the coating. The measured voltage, current, or combinations thereof, or changes thereto, may then be correlated with the structural condition of coating. For example, an increase in voltage over time may be correlated to the formation of and/or presence of defects in the coating; a decrease in current over time may be correlated to the formation and/or presence of defects in the coating; or combinations thereof. In some such aspects, such "health" monitoring of the coating includes continually or continuously varying the voltage, current, or both across the coating to scan across the coating throughout the entire volume of the coating. Thus, the structural status of the coatings disclosed herein may be monitored without necessarily having to manually inspect the coating and/or without having to cease operations of the part underlying the coating to perform the inspection. That is, the structural status of the coatings may be monitored while the part underlying the coating is operating.

Electrical Measurements—Passive Mode

Figure 2:
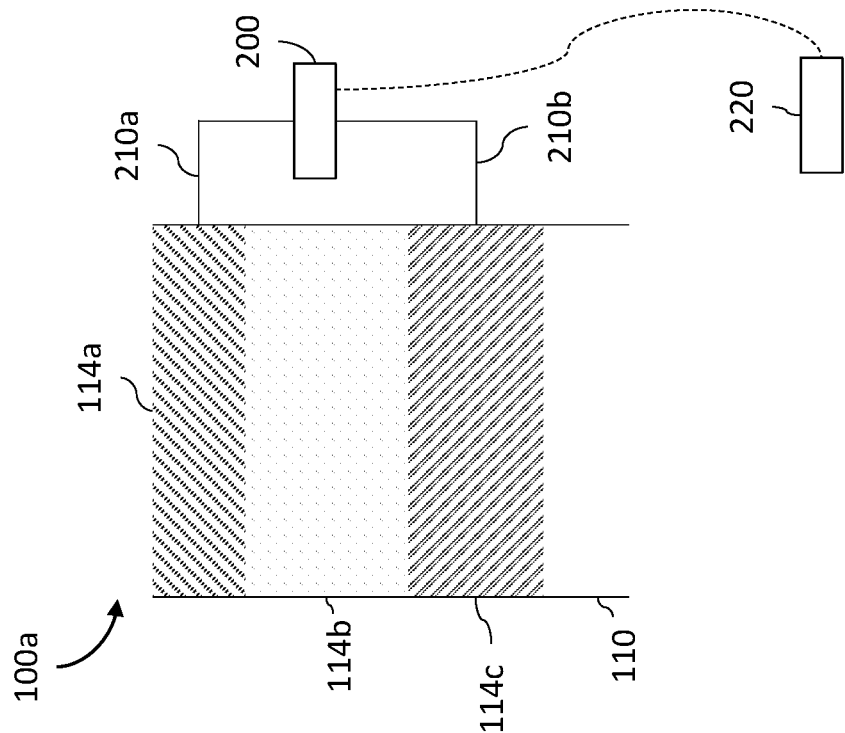
FIG. 2 depicts a part having a three-layer coating electrically coupled with a voltage meter for passive mode monitoring of the part.
Figure 4:
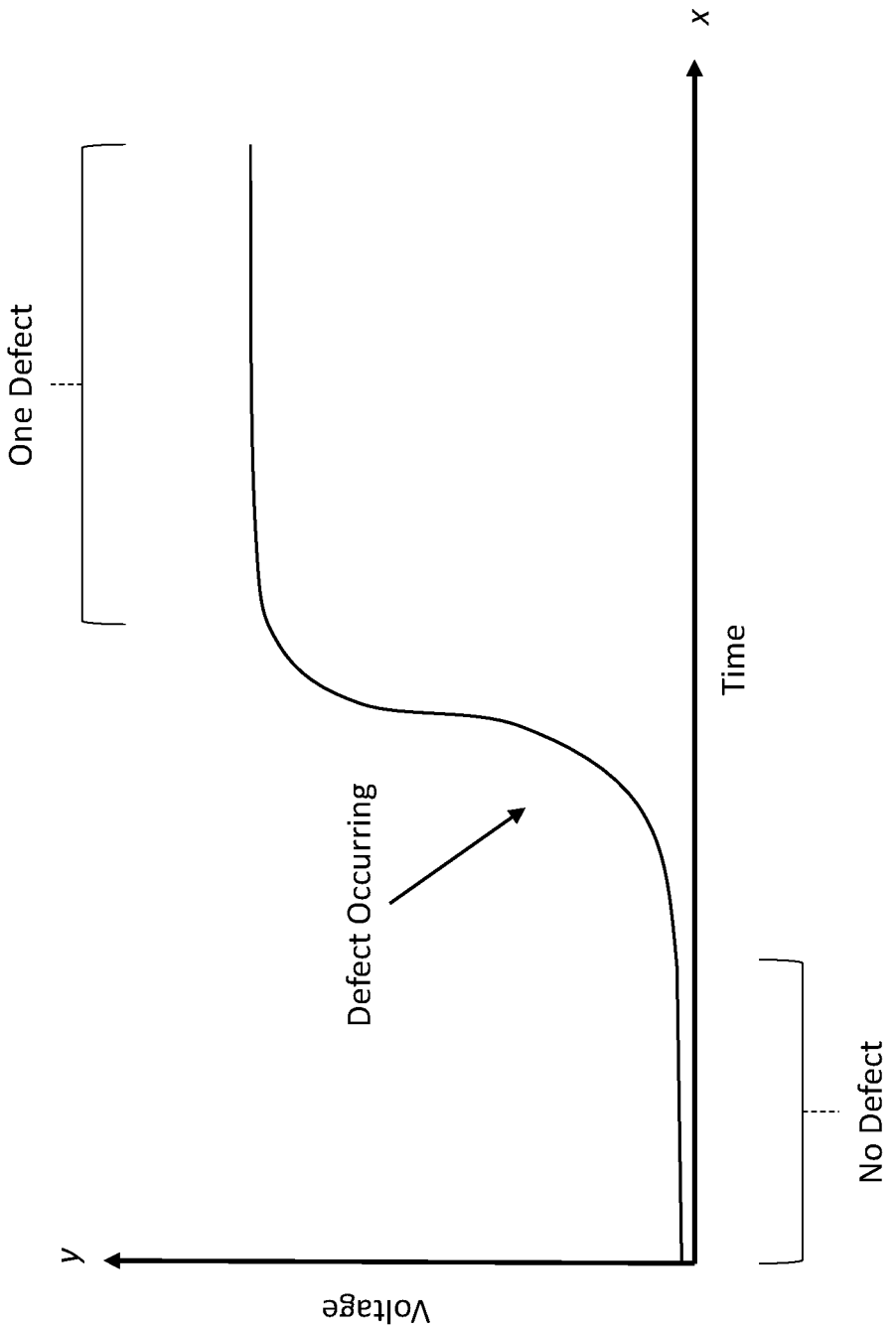
FIG. 4 is a graph of voltage vs. time, showing the voltage response to the occurrence of and presence of a scratch in a coating on a part during passive mode monitoring of the part.

FIG. 2 depicts coated part 100a of FIG. 1 electrically coupled with voltmeter 200 for passive mode monitoring of coated part 100a. First layer 114a is electrically coupled with voltmeter 200 via electrical coupling 210a (e.g., wire), and third layer 114c is electrically coupled with voltmeter 200 via electrical coupling 210b. Thus, first layer 114a and third layer 114c are electrically coupled through voltmeter 200 and electrical couplings 210a and 210b. As such, each conductive layer of multi-layered coating 112a is wired for in-service voltage monitoring to provide "health" prognostics associated with coated part 100a. With the arrangement of layers 114a-114c, voltmeter 200, and electrical couplings 210a and 210b, voltage may be monitored to assess the maximum depth of penetration of defects, such as scratches, in the coating. In FIG. 2, no defect is present in the coating. With no defects present in the coating, the voltage between first layer 114a and third layer 114c, as monitored by voltmeter 200, is zero or substantially zero. As would be understood by one skilled in the art, the measurements taken by voltmeter 200 may be taken in series, over time, continually or continuously. Such voltage data may internally processed, stored, and/or displayed by voltmeter 200 for assessment by a user. Also, such voltage data may be transmitted from voltmeter 200 to computer 220 for processing, storing, and/or displaying the data for assessment by a user. FIG. 4 depicts one exemplary graph of voltage of a coating on a coated part, as measured over time. The section of the plot indicated by "No Defect" is exemplary of the data associated with the status of coated part 100a in FIG. 2, where no defects, such as scratches, are present.

FIG. 3 depicts coated part 100a of FIGS. 1 and 2; however, in FIG. 3 defect 300 is present in coating 112a. Defect 300 is shown as a scratch in coating 112a. However, coating 112a may include any of various other defects instead of or in addition to a scratch. As shown, defect 300 has a dept 310 that extends fully through first layer 114a and second layer 114b, only partially through third layer 114c, and does not extend to or through base material 110. Defect 300 has a greater width 320a at the uppermost first layer 114 than the width 320b of defect 300 at the lowermost, third layer 114c. One skilled in the art would understand that this defect is shown in FIG. 3 for exemplary purposes, and that the methods disclosed here are not limited to monitoring and detecting only the particular defects shown in the present Figures.

With defect 300 present in coating 112a, the voltage between first layer 114a and third layer 114c, as monitored by voltmeter 200, is not zero or substantially zero. With reference to FIG. 4, the section of the plot indicated by "One Defect" is exemplary of the data associated with the status of coated part 100a in FIG. 3, where a single defect, such as a scratch, is present at least partially through coating 112a. Thus, moving along the plot in FIG. 4, from left to right, at first coating 112a has no defect (e.g., no scratch) as shown in FIG. 2. Moving further right along the plot, the occurrence of a defect (e.g., scratch) is indicated by the rise in voltage (the section of the plot indicated by "Defect Occurring"). Moving further right along the plot, once the propagation of the defect has ceased or slowed (e.g., once the scratch has reached depth 310 as shown in FIG. 3) the plot stabilizes at a new, higher voltage that is higher than prior to the occurrence of the defect. This higher voltage is indicative of a defect present in coating 112a. The stability of the higher voltage is indicative of the permanence of the defect in coating 112a. Thus, moving along the plot in FIG. 4, from left to right, corresponds with the coating 112a transitioning from the status shown in FIG. 2 to the status shown in FIG. 3. As such, monitoring the voltage between two different conductive layers in the coatings disclosed herein allows for monitoring for the occurrence of and presence of defects within the coating. A defect within the coating may be indicative of the need to repair or replace the coating or the underlying part. While coating 112a in FIG. 3 is shown as including a single defect, the present methods are not limited to the detection of only one defect.

FIGS. 5A-5C depict coated part 100b having no defect, having a relatively shallow scratch, and having a relatively deep scratch, respectively. Coating 112b is a five-layer coating including first layer 114a (an outermost and conductive layer), second layer 114b (a non-conductive layer), third layer 114c (a conductive layer), fourth layer 114d (a non-conductive layer), and fifth layer 114e (an innermost and conductive layer).

As shown, coated part 100b is electrically coupled with multiple voltmeters. First voltmeter 200a is electrically coupled with first layer 114a (outermost layer) via electrical coupling 210a, and with third layer 114c via electrical coupling 210b. Second voltmeter 200b is electrically coupled with third layer 114c via electrical coupling 210c, and with fifth layer 114e (innermost layer) via electrical coupling 210d. As such, first voltmeter 200a may monitor for defects that extend through first, second, and third layers 114a-114c of coating 112b, and second voltmeter 200b may monitor for defects that extend through third, fourth, and fifth layers 114c-114e of coating 112b. Such an arrangement of layers 114a-114e and voltmeters 200a and 200b allows for the determination, or at least approximation, of the depth of a defect within coating 112b. That is, the method may be used to discretely determine if a defect extends at least partially through the first layer 114a, the first and third layers 114a and 114c, or the first, third and fifth layers 114a, 114c, and 114e.

In FIG. 5A, no defect is present in coating 112b. In FIG. 5B, a relatively shallow defect, scratch 500a, extends partially through coating 112b. Scratch 500a extends fully through first and second layers 114a and 114b, and partially through third layer 114c, and has a depth 510a. In FIG. 5C, a relatively deeper defect, scratch 500b, extends partially through coating 112b. Scratch 500b extends fully through first, second, third, and fourth layers 114a-114d, and partially through fifth layer 114e, and has a depth 510b. Depth 510b is greater than depth 510a. Scratch 500b may be the same scratch as scratch 500a, but after further propagation of the scratch. Or, scratch 500b may be a different scratch than scratch 500a located at a different location in coated part 100b (or on a different part altogether). For the purposes of explanation, scratch 500b is herein described as the same scratch as scratch 500a, but after further propagation of the scratch. Scratch 500a, and the at least approximate depth thereof, may be detected by the voltage between first and third layers 114a and 114c, as measured by voltmeter 200a. Scratch 500b, and the at least approximate depth thereof, may be detected by the voltage between first and third layers 114a and 114c, as measured by voltmeter 200a, as well as the voltage between third and fifth layers 114c and 114e, as measured by voltmeter 200b.

In the scenario depicted in FIG. 5C and voltmeters 200a and 200b would both measure a $\Delta V$ of greater than 0. In some aspects, the conductive layers of coating 112b are progressively more noble when moving from base material 110 towards the outermost, first layer 114a, such that first layer 114a is the most noble layer of the conducive layers of coating 112b and the innermost layer, fifth layer 114e in the embodiment shown in FIG. 5C, is the least noble layer of the conducive layers of coating 112b. In such embodiments, there is an increased driving force as a defect penetrates deeper into coating 112b. Thus, the rate and probability of failure of the part increases as the defect penetrates deeper into coating and/or part. The greatest voltage signal gain will occur with the $\Delta V_1$ measured by voltmeter 200a and $\Delta V_2$ measured by voltmeter 200b both greater than 0. The smallest voltage signal gain will occur with the $\Delta V_1$ measured by voltmeter 200a and $\Delta V_2$ measured by voltmeter 200b both less than 0. Intermediate voltage signal gains will occur with one of the $\Delta V_1$ and $\Delta V_2$ greater than 0 and the other less than 0.

Figure 6:
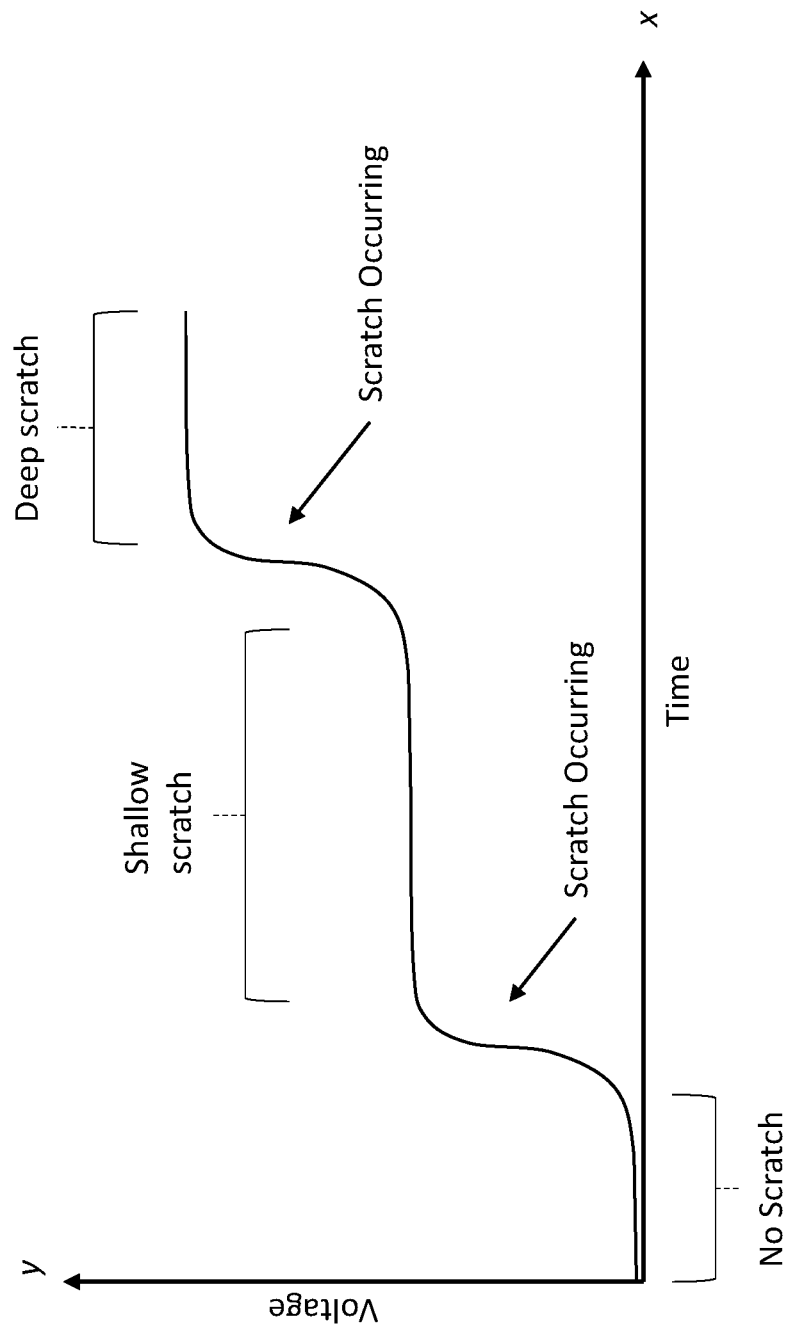
FIG. 6 is a graph of voltage vs. time, showing the voltage response to the occurrence of and presence of a first, relatively shallow scratch in a coating on a part during passive mode monitoring of the part, as well as the voltage response to the occurrence of and presence of a second, relatively deeper scratch in the coating on the part during passive mode monitoring of the part.

FIG. 6 is a graph of voltage vs. time that corresponds with the absence of defects (FIG. 5A), the formation of scratch 500a (FIG. 5B) and the propagation of scratch 500a into scratch 500b (FIG. 5C). FIG. 6 shows the voltage response to the occurrence of and presence of the first, relatively shallow scratch 500a in coating 112b, as well as the voltage response to the occurrence of and presence of the second, relatively deeper penetration of scratch 500b in coating 112b. Moving along the plot in FIG. 6, from left to right, at first coating 112b has no defect (e.g., no scratch) as shown in FIG. 5A. Moving further right along the plot, the first occurrence of a defect is indicated by the first rise in voltage. Moving further right along the plot, once the propagation of the defect has at least temporarily ceased or slowed (i.e., once the scratch has reached depth 510a as shown in FIG. 5B) the plot stabilizes at a new, higher voltage than prior to the occurrence of the scratch 500a. This higher voltage is indicative of scratch 500a. Moving further right along the plot, the further propagation of the scratch is indicated by the second rise in voltage. Moving further right along the plot, once the further propagation of the scratch has at least temporarily ceased or slowed (i.e., once the scratch has reached depth 510b as shown in FIG. 5C) the plot stabilizes at a new, higher voltage. This higher voltage is indicative of deep scratch 500b. Thus, moving along the plot in FIG. 6, from left to right, corresponds with the coating 112b transitioning from the status shown in FIG. 5A, to the status shown in FIG. 5B, and then to the status shown in FIG. 5C. The magnitude of the voltage response is responsive to and indicative of the depth of penetration of the defect within and/or through the coatings disclosed herein. Therefore, monitoring the voltage between the various different conductive layers in the coatings disclosed herein allows for monitoring for the occurrence of and presence of defects within the coating, as well as to monitoring of the depth of such defects.

With the application of voltage, the selection of materials for use in each layer of the coating, and the design (i.e., the arrangement and/or thickness and/or composition) of the coating and each layer thereof, the methods disclosed herein provide the ability to assess the presence of defects and the depth of penetration thereof within the coating. While the occurrence of a voltage (differential in the electric potential between the layers) may be an indication that a part (component or tool, such as a ball valve) is no longer functioning, the occurrence of a voltage does not necessarily indicate such. However, the occurrence of such a voltage is indicative that the sealing surface (i.e., the coating) has been compromised by a defect, and that a failure of the coating and/or part may be imminent, or is at least more likely than in the absence of such a voltage.

Figure 7:
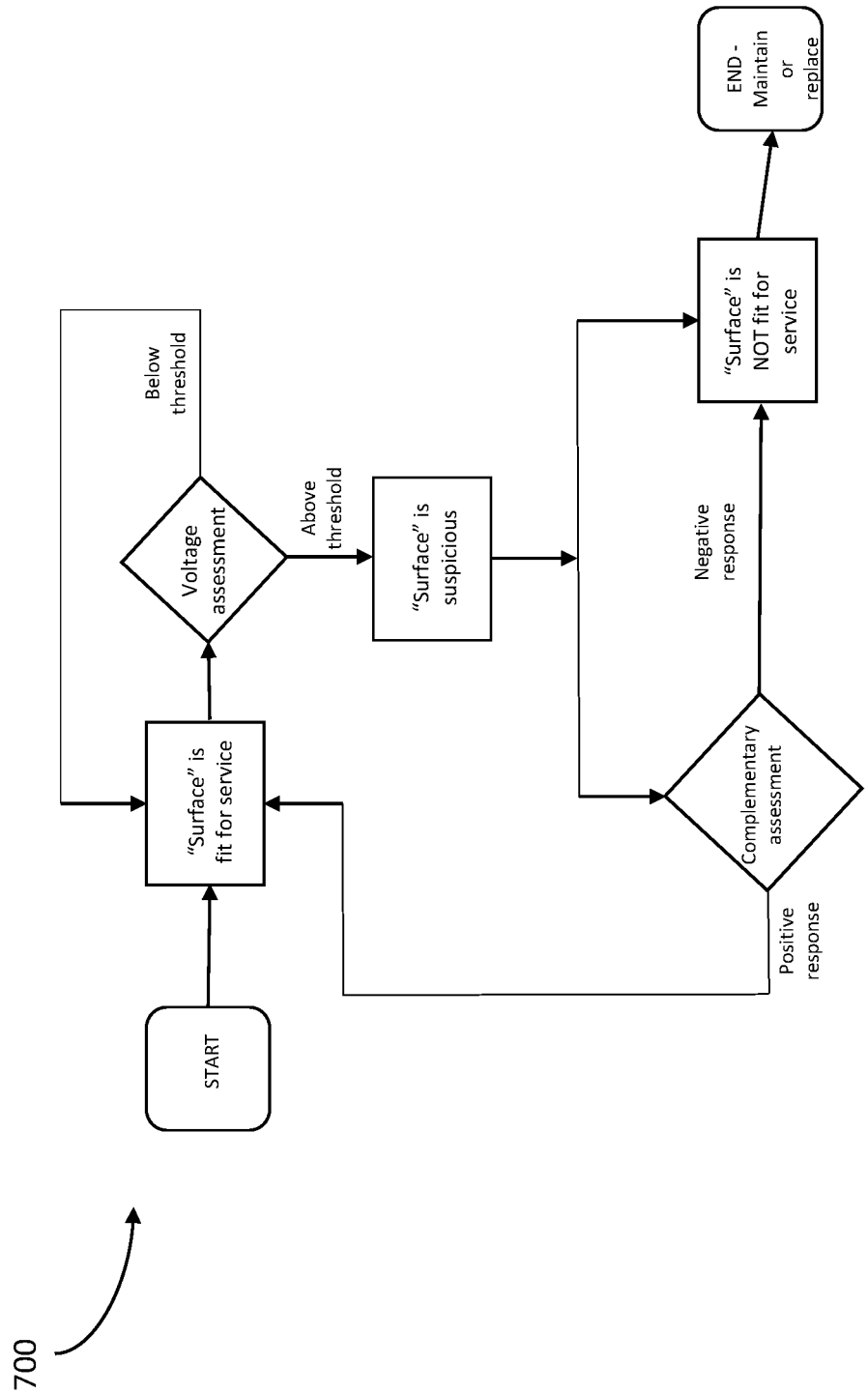
FIG. 7 is a flow chart showing steps of passively monitoring of a part having a coating that is electrically coupled with a voltage meter.

FIG. 7 is a flow chart showing steps of passively monitoring of a part having a coating that is electrically coupled with a voltmeter. Passive monitoring process 700 includes providing a coated part (e.g., a ball valve), or coating an uncoated part, and electrically coupling one or more voltmeters with the coated part, such as is shown in FIGS. 2, 3 and 5A-5C. As such a part having a surface that is suitable for deployment and service is deployed and operated in an operational environment (e.g., and a downhole environment).

Before, during, and/or after deployment and operation of the coated part in the operational environment, the voltage associated with the coating of the coated part may be monitored. The voltage may be monitored continuously or continually. As long as the measured voltage is below a threshold voltage, the part is considered to have a surface that is suitable for deployment and service in the operational environment. The threshold voltage may vary depending on, for example, the underlying part, the operational conditions, the coating, and other factors.

Upon the measurement of a voltage that is above the threshold voltage, the surface of the part is considered at least of suspect condition. At this point, the surface of the part may be considered unsuitable for deployment and service in the operational environment, such that the part is retrieved and maintained (e.g., repaired or recoated) or replaced with a replacement coated part. Optionally, rather than considering the coated part as unsuitable for deployment and service in the operational environment at this point, the surface of the part may be subjected to a further assessment, such as a visual or other inspection, to determine the suitability of the coated part for deployment and service in the operational environment. If the further assessment of the coated part results in a determination that the coated part is considered unsuitable for deployment and service in the operational environment, then the coated part is retrieved and maintained (e.g., repaired or recoated) or replaced with a replacement coated part. If the further assessment of the coated part results in a determination that the coated part is considered suitable for deployment and service in the operational environment, then deployment and use of the coated part in the operational environment is continued, while also continuing monitoring of the part. The voltage measurements may be assessed using, for example, graphs, such as those in FIGS. 4 and 6, or other forms of voltage data, where spikes or other fluctuations in voltage may indicate the occurrence and/or presence of defects in the coated part, or at least in the coating thereof.

Electrical Measurements—Active Mode

Figure 8:
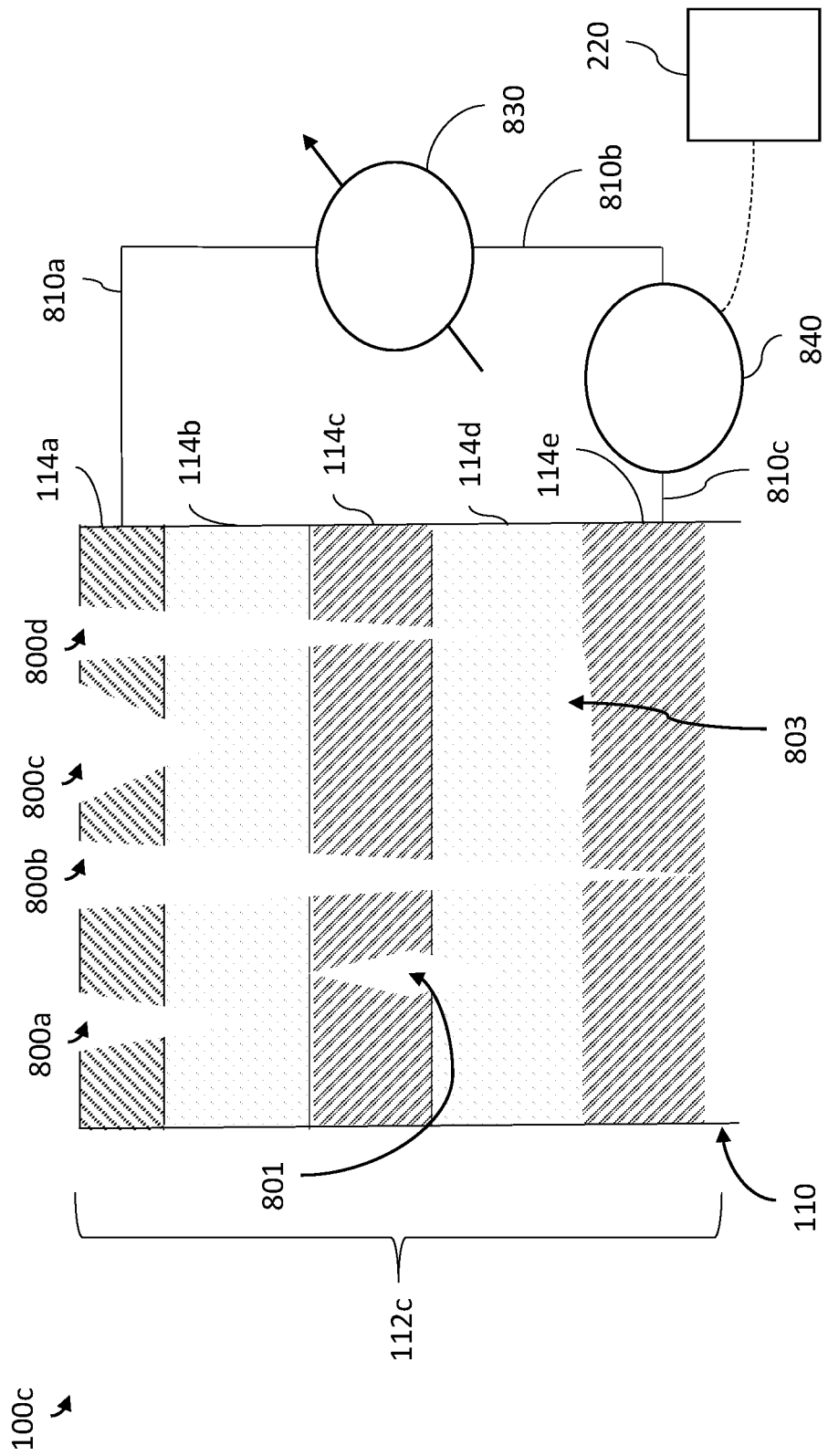
FIG. 8 depicts a part having a five-layer coating electrically coupled with an ammeter and a variable voltage source for active mode monitoring of the part, with scratches, cracking, and debonding present in the coating.

FIG. 8 depicts coated part 100c, including a five-layer coating 112c electrically coupled on base material 110. Coating 112c includes outermost, first layer 114a, second layer 114b, third layer 114c, fourth layer 114d, and innermost, fifth layer 114e. In some aspects, for active mode monitoring, each layer 114a-114e of coating 112c is a conductive layer.

Coating 112c is electrically coupled with ammeter 840 and voltage source 830 (e.g., variable voltage source) via electrical couplings 810a-810c (e.g., wires). As shown, electrical coupling 810a is coupled between outermost, first layer 114a and voltage source 830; electrical coupling 810c is coupled between innermost, fifth layer 114e and ammeter 840; and electrical coupling 810b is coupled between ammeter 840 and voltage source 830, defining an electrical circuit.

Coated part 100c includes scratches 800a-800d of various depths, crack 801 and debonding 803 (delamination) between two layers, 114d and 114e, of coating 112c. To monitor coated part 100c for such defects, voltage is applied across the circuit via voltage source 830, the volume of coating 112c provides electrical resistance within the circuit, and ammeter 840 measures the current across the circuit. In operation, the greater the amount or degree of defect to coating 112c, the greater the change in current and resistance there is across the circuit. That is, reductions in the overall cross-section of coating 112c due to defects will cause the resistance in the circuit to increase; thereby, causing the current across the circuit to decrease (under an invariant voltage). Such current decrease will be detected by ammeter 840. Such current data may internally processed, stored, and/or displayed by ammeter 840 for assessment by a user. Also, such current data may be transmitted from ammeter 840 to computer 220 for processing, storing, and/or displaying the data for assessment by a user.

Figure 9:
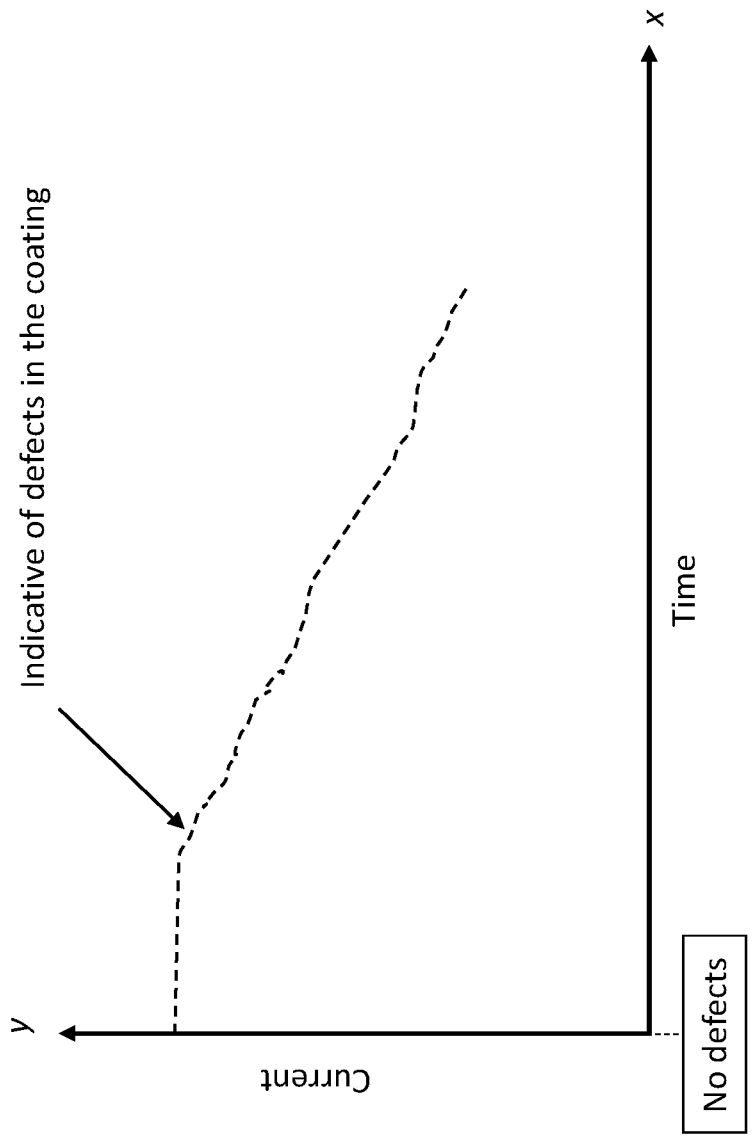
FIG. 9 is a graph of current vs. time, showing the current response to the occurrence of and presence of damage in a coating on a part during active mode monitoring of the part.

FIG. 9 is a graph of current vs. time, showing the current response to the occurrence of and presence of defects in the coating on a part during active mode monitoring of the coated part. Moving along the plot, from left to right, the current begins at its peak where "No Defect" is indicated. Continuing to move rightwards on the plot, an inflection point in the current is noted, where the current begins to drop. This inflection point is indicative of defects occurring and/or present in the coating. As shown, the measured current continues to drop over time, indicating that the existing defects to the coating are getting worse and/or that additional defects to the coating are occurring. In some aspects, to increase the current measurement sensitivity (signal-to-noise ratio), the voltage applied by voltage source 830 may be cycled to various different levels (e.g., between low and high voltages).

Figure 10:
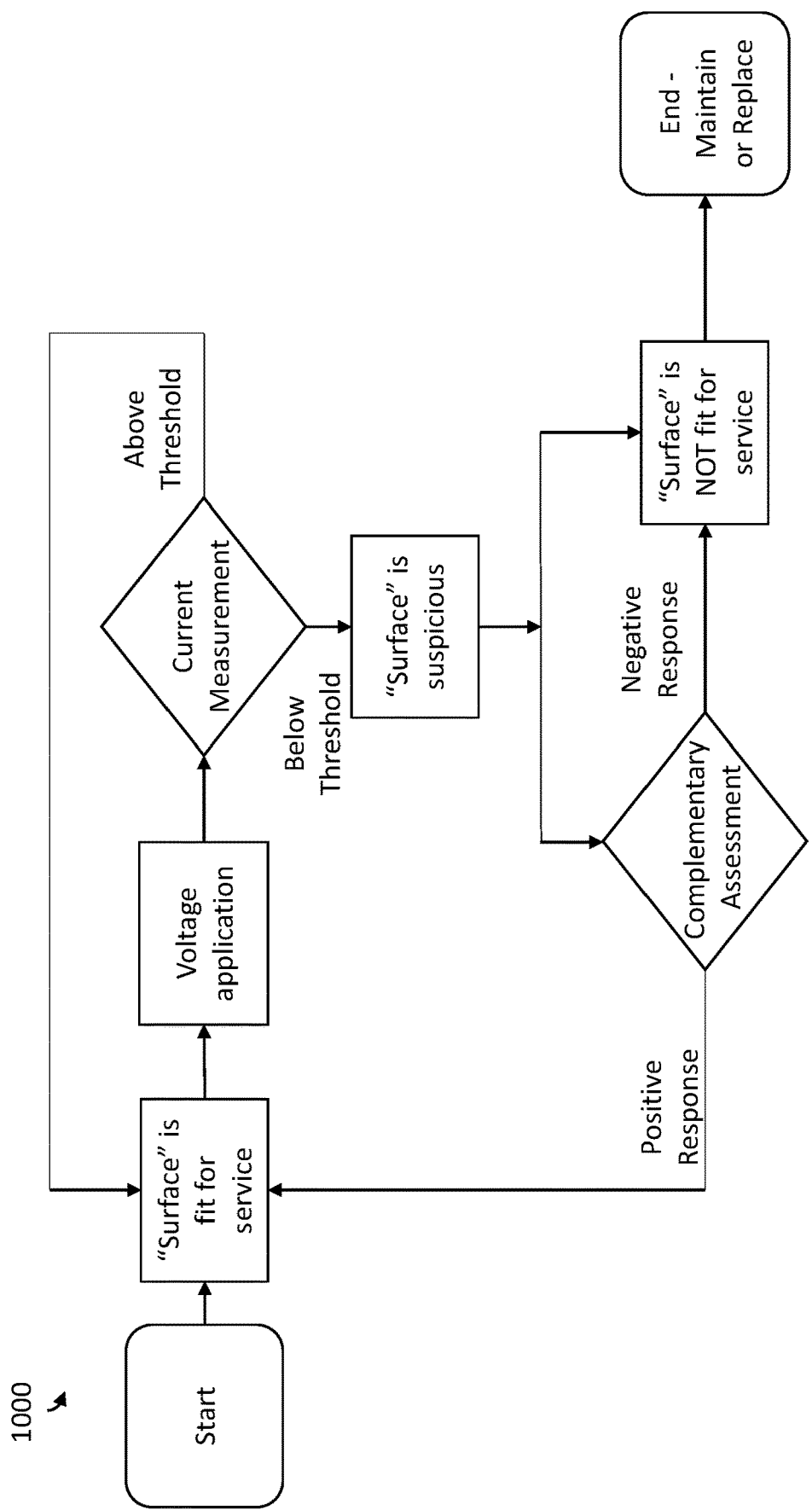
FIG. 10 is a flow chart showing steps of actively monitoring of a part having a coating that is electrically coupled with an ammeter and a variable voltage source.

FIG. 10 is a flow chart showing steps of actively monitoring of a part having a coating that is electrically coupled with an ammeter and a variable voltage source. Active monitoring process 1000 includes providing a coated part (e.g., a ball valve), or coating an uncoated part, and electrically coupling one or more ammeters and voltage sources with the coated part, such as is shown in FIG. 8. As such, a part having a surface that is suitable for deployment and service is deployed and operated in an operational environment (e.g., and a downhole environment).

Before, during, and/or after deployment and operation of the coated part in the operational environment, voltage is applied to the coated part via the voltage source and the current across the coating is measured. The application of voltage and the measurement of current may be performed continuously or continually. As long as the measured current is above a threshold current, the part is considered to have a surface that is suitable for deployment and service in the operational environment. The threshold current may vary depending on, for example, the underlying part, the operational conditions, the coating, and other factors.

Upon the measurement of a current that is below the threshold current, the surface of the part is considered at least of suspect condition. At this point, the surface of the part may be considered unsuitable for deployment and service in the operational environment, such that the part is retrieved and maintained (e.g., repaired or recoated) or replaced with a replacement coated part. Optionally, rather than considering the coated part as unsuitable for deployment and service in the operational environment at this point, the surface of the part may be subjected to a further assessment, such as a visual or other inspection, to determine the suitability of the coated part for deployment and service in the operational environment. If the further assessment of the coated part results in a determination that the coated part is considered unsuitable for deployment and service in the operational environment, then the coated part is retrieved and maintained (e.g., repaired or recoated) or replaced with a replacement coated part. If the further assessment of the coated part results in a determination that the coated part is considered suitable for deployment and service in the operational environment, then deployment and use of the coated part in the operational environment is continued, while also continuing apply voltage and monitoring current across the coating. The current measurements may be assessed using, for example, graphs, such as that shown in FIG. 9, or other forms of current data, where drops or other fluctuations in current may indicate the occurrence and/or presence of defects in the coated part, or at least in the coating thereof.

Electrical Measurements—Active and Passive Mode

Figure 11:
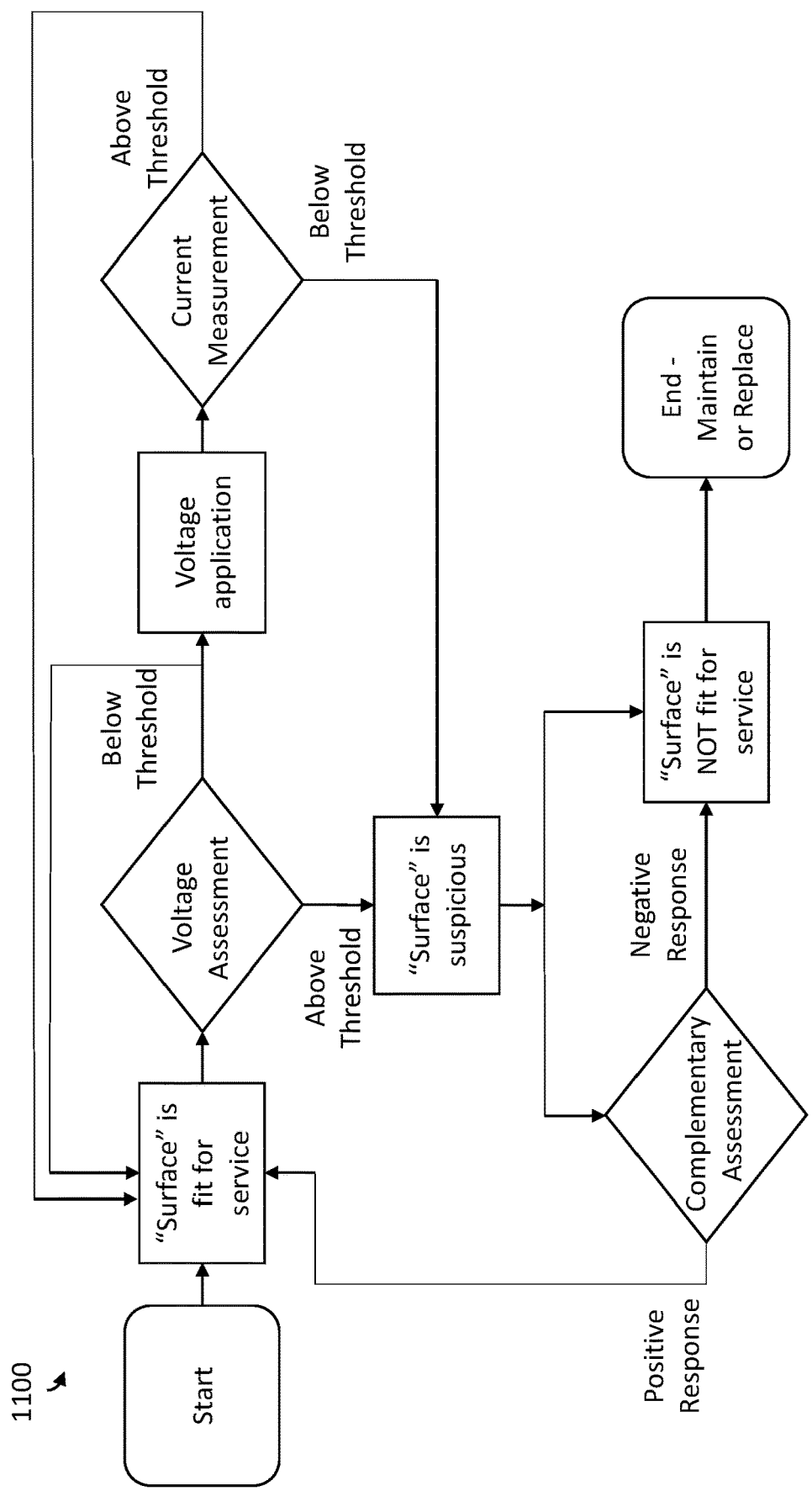
FIG. 11 is a flow chart showing steps of passively and actively monitoring of a part having a coating that is electrically coupled with a voltage meter, an ammeter and a variable voltage source.

FIG. 11 is a flow chart showing steps of passively and actively monitoring (dual monitoring) of a part having a coating that is electrically coupled with a voltage meter, an ammeter and a variable voltage source. Dual monitoring process 1100 includes providing a coated part (e.g., a ball valve), or coating an uncoated part, electrically coupling one or more ammeters and voltage sources with the coated part, and electrically coupling one or more voltmeters with the coated part. As such, a part having a surface that is suitable for deployment and service is deployed and operated in an operational environment (e.g., and a downhole environment).

Before, during, and/or after deployment and operation of the coated part in the operational environment, the voltage associated with the coating of the coated part may be monitored. The voltage may be monitored continuously or continually. As long as the measured voltage is below a threshold voltage, the part is considered to have a surface that is suitable for deployment and service in the operational environment.

Upon the measurement of a voltage that is above the threshold voltage, the surface of the part is considered at least of suspect condition. At this point, the surface of the part may be considered unsuitable for deployment and service in the operational environment, such that the part is retrieved and maintained (e.g., repaired or recoated) or replaced with a replacement coated part. Optionally, rather than considering the coated part as unsuitable for deployment and service in the operational environment at this point, the surface of the part may be subjected to a further assessment, such as a visual or other inspection, to determine the suitability of the coated part for deployment and service in the operational environment. If the further assessment of the coated part results in a determination that the coated part is considered unsuitable for deployment and service in the operational environment, then the coated part is retrieved and maintained (e.g., repaired or recoated) or replaced with a replacement coated part. If the further assessment of the coated part results in a determination that the coated part is considered suitable for deployment and service in the operational environment, then deployment and use of the coated part in the operational environment is continued, while also continuing monitoring of the part. The voltage measurements may be assessed using, for example, graphs, such as those in FIGS. 4 and 6, or other forms of voltage data, where spikes or other fluctuations in voltage may indicate the occurrence and/or presence of defects in the coated part, or at least in the coating thereof.

Before, during, and/or after deployment and operation of the coated part in the operational environment, voltage is applied to the coated part via the voltage source and the current across the coating is measured. The application of voltage and the measurement of current may be performed continuously or continually. As long as the measured current is above a threshold current, the part is considered to have a surface that is suitable for deployment and service in the operational environment.

Upon the measurement of a current that is below the threshold current, the surface of the part is considered at least of suspect condition. At this point, the surface of the part may be considered unsuitable for deployment and service in the operational environment, such that the part is retrieved and maintained (e.g., repaired or recoated) or replaced with a replacement coated part. Optionally, rather than considering the coated part as unsuitable for deployment and service in the operational environment at this point, the surface of the part may be subjected to a further assessment, such as a visual or other inspection, to determine the suitability of the coated part for deployment and service in the operational environment. If the further assessment of the coated part results in a determination that the coated part is considered unsuitable for deployment and service in the operational environment, then the coated part is retrieved and maintained (e.g., repaired or recoated) or replaced with a replacement coated part. If the further assessment of the coated part results in a determination that the coated part is considered suitable for deployment and service in the operational environment, then deployment and use of the coated part in the operational environment is continued, while also continuing apply voltage and monitoring current across the coating. The current measurements may be assessed using, for example, graphs, such as that shown in FIG. 9, or other forms of current data, where drops or other fluctuations in current may indicate the occurrence and/or presence of defects in the coated part, or at least in the coating thereof.

Figure 12:
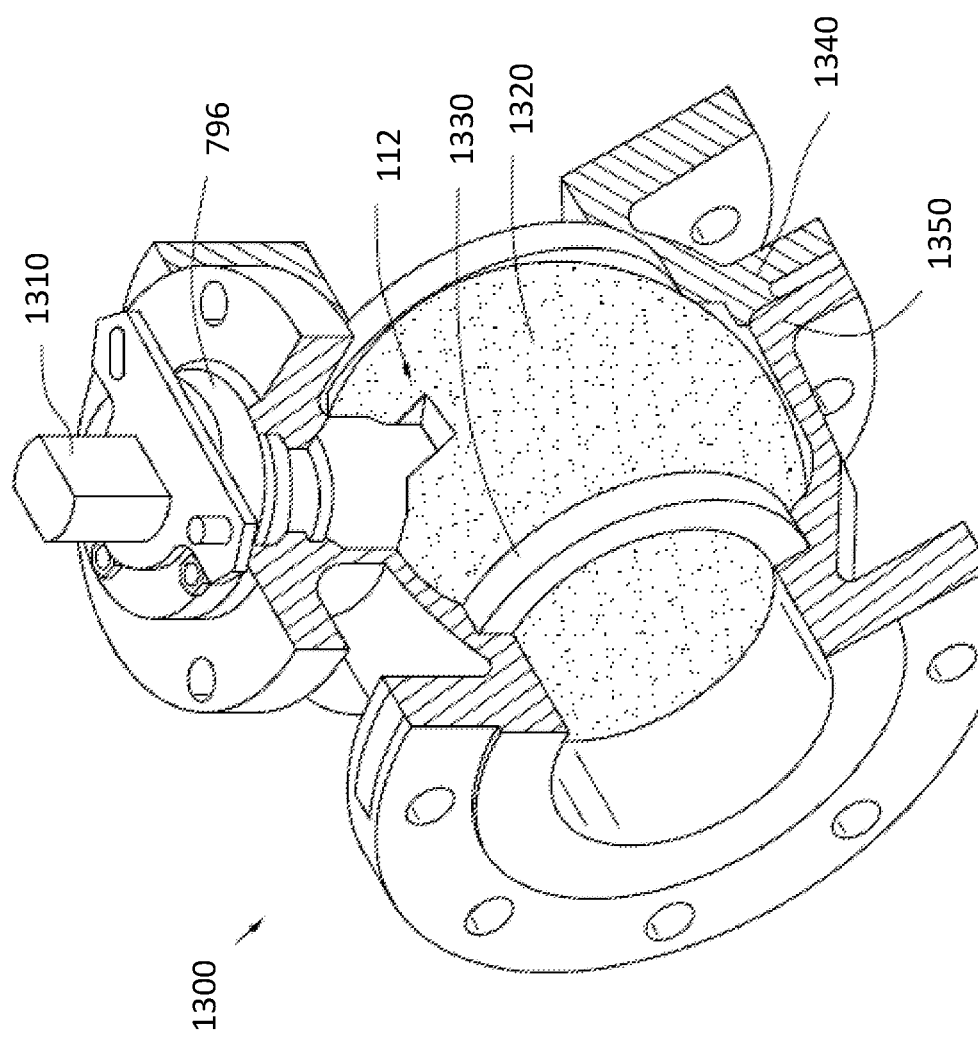
FIG. 12 depicts a ball valve having a coating in accordance with the present disclosure.

FIG. 12 depicts ball valve 1300, including stem 1310, ball 1320, seat 1330, cap 1340, and body 1350. One skilled in the art would understand the function, use, and operation of a ball valve, such as is shown in FIG. 12. As such, the details of the function, use, and operation of ball valve 1300 will not be addressed herein. Rather, ball valve 1300 is shown as an exemplary part upon which coatings in accordance with the present disclosure may be applied. For example, a coating in accordance with the present disclosure may be applied to ball 1320, seat 1330, stem 1310, bearing, or another portion of ball valve 1300. As shown, coating 112 is on at least a portion of ball 1320.

Method of Making and Deploying Coated Parts

FIGS. 13A-13D depict a part through various stages of production and use. Uncoated part 1400a may be subjected to a coating application 1410 to apply coating 112 to base material 110 of uncoated part 1400a, forming coated part 1400b. Uncoated part 1400a is shown generically as a cylinder for the purposes of simplicity and explanation. However, uncoated part 1400a may be any of various parts, such as a ball valve. Coated part 1400b may then be electronically coupled 1420 with monitoring equipment 1499 for monitoring of electrical properties of coating 112. Monitoring equipment 1499 may be or include the voltmeters, ammeters, and voltage sources as described elsewhere herein. Coated part 1400b, coupled with monitoring equipment 1499, may then be deployed 1430 into an operational environment 1497, such as at an oilfield. Coated part 1400b, coupled with monitoring equipment 1499, may then be operated within operational environment 1497, while continually or continuously monitoring the electrical properties of the coating 112. Once voltage measurements, current measurements, or combinations thereof indicate that coated part 1400b or coating 112 thereof has or may have a defect, deployed coated part 1400b may be maintained (e.g., recoated), replaced, and/or inspected to confirm the presence and extent of the defect.

In certain aspects, coating application 1410 includes sequentially coating each layer of coating 112 onto uncoated part 1400a to form coated part 1400b, beginning with the innermost, bottom layer and ending with the outermost, top layer of coating 112. The method may include depositing at least three layers, including both conductive and non-conductive layers. The conductive and non-conductive layers may be arranged in an alternating arrangement, such that at least one non-conductive layer is sandwiched between two conductive layers. For example, a first, innermost electrically conductive layer may be applied to base material 110 of uncoated part 1400a via electroplating, electroless plating, chemical vapor deposition (CVD), physical vapor deposition (PVD), or thermal spray process, followed by applying a first electrically non-conductive layer over the first innermost electrically conductive layer via spraying, a sol-gel process, CVD, or PVD, followed by applying another electrically conductive layer over the first electrically non-conductive layer, and so forth until the desired number of layers have been applied to form coating 112. In some aspects, each electrically conductive layer is the same as or different than the other electrically conductive layers of coating 112. In some aspects, each electrically non-conductive layer is the same as or different than the other electrically non-conductive layers of coating 112.

Applications

The coatings disclosed herein, as well as the assemblies including the coatings electrically coupled to a source of electrical potential, a current measuring apparatus, or combinations thereof, may be used in any of various applications, and are not limited to use in the specific applications shown in the present drawings. The coatings disclosed herein, as well as the assemblies including the coatings electrically coupled to a source of electrical potential, a current measuring apparatus, or combinations thereof, may be used in any of numerous applications where data related to the structural status of the coating and the surface integrity of the underlying part is desired, including applications where the part underlying the coating (and therefore the coating) is subjected to wear or degradation and/or harsh conditions (e.g., high temperatures) during operation of the part. Exemplary applications where the coatings disclosed herein, as well as the assemblies including the coatings electrically coupled to a source of electrical potential, a current measuring apparatus, or combinations thereof, may be used include various oil and gas exploration applications; oilfield applications, aerospace applications, mining applications, and other applications. The coating may be applied to flow control components (e.g., valves), such as ball valves and gate valves. The coating may be applied to drilling parts, including drill bits; oil and gas production parts, including downhole valves and pumps; and other oilfield parts. In certain particular applications, the coating may be applied to a ball of a ball valve, a seat of a valve, a stem of a valve, and/or a bearing.

In operation, the coatings provide a barrier to the underlying part, such that the coating is subjected to abrasive wear (or other degradation or wear) prior to the underlying part. As the coating is electrically coupled to a source of electrical potential, a current measuring apparatus, or combinations thereof, the wear or other degradation on the coating may be monitored before, during, and after operations such that maintenance and/or replacement can be implemented prior to wear or degradation of the underlying part, or at least prior to failure of the underlying part. As such, wear, degradation, and/or failure of the underlying part may be reduced (in comparison to an otherwise identical part in the absence of the electrically coupled coating) or avoided.

Methods of Use

Certain aspects of the present disclosure include methods of using electrically smart coatings or materials for condition-base monitoring of parts, including detecting the surface integrity of the parts or components thereof. The coatings or materials provide parts having self-sensing or self-detecting functionalities (i.e., sensing or detecting of defects), providing for the ability to diagnose when maintenance and/or replacement of the part (e.g., valve replacement) is necessary or desirable. In certain aspects, use of the coatings disclosed herein provides for longer equipment service times; TCO reductions; and operation of parts in extreme temperature, abrasive service applications. Thus, the present disclosure provides for a diagnostic method where the voltage and/or current data that is collected from the coating may be analyzed to make any of various critical decisions related to the health-monitoring of the part, optionally including: (1) whether to pause or cease operations of the part; (2) whether to recoat the part with an additional coating in accordance with the present disclosure: (3) whether to perform maintenance on the part; and (4) whether to replace the part.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a part including a base material; and
a multilayer coating on the base material, wherein the multilayer coating comprises at least three layers including first and second electrically conductive layers, wherein the first electrically conductive layer is an outermost layer on the part, wherein the multilayer coating is electrically responsive to a condition of the multilayer coating for condition-based monitoring of the coating and the part.

2. The apparatus of claim 1, wherein the multilayer coating includes at least one electrically non-conductive layer positioned between the first and second electrically conductive layers.

3. The apparatus of claim 2, wherein the second electrically conductive layer is disposed at a greater depth than the first electrically conductive layer, wherein a first thickness of the first electrically conductive layer is less than a second thickness of the second electrically conductive layer.

4. The apparatus of claim 1, wherein each of the first and second electrically conductive layers exhibit a hardness ranging from 450 to 1500 HVN, exhibit corrosion resistance, or combinations thereof.

5. The apparatus of claim 1, further comprising a condition-based monitoring system, comprising:
a voltmeter electrically coupled between the first and second electrically conductive layers, wherein the multilayer coating includes at least one electrically non-conductive layer positioned between the first and second electrically conductive layers;
an ammeter and a source of electrical potential electrically coupled between the first and second electrically conductive layers, wherein each layer of the multilayer coating is an electrically conductive layer; or
combinations thereof.

6. The apparatus of claim 5, wherein:
the multilayer coating is responsive to voltage such that voltage between the first and second electrically conductive layers of the multilayer coating varies in response to the presence of a defect in the multilayer coating;
the multilayer coating is responsive to current such that current between the first and second electrically conductive layers of the multilayer coating varies in response to the presence of a defect in the multilayer coating; or
combinations thereof.

7. The apparatus of claim 1, wherein the part is a valve, a drill bit, or a pump.

8. The apparatus of claim 1, wherein the part is a ball, a seat, a stem, or a bearing of a valve.

9. A method for making an apparatus comprising:
providing a part, the part including a base material; and
applying a multilayer coating to at least a portion of the base material, wherein the multilayer coating comprises at least three layers including first and second electrically conductive layers, wherein the first and second electrically conductive layers extend continuously in two-dimensions along the portion, wherein the multilayer coating is electrically responsive to a condition of the multilayer coating for condition-based monitoring of the coating and the part.

10. The method of claim 9, wherein applying the multilayer coating includes applying at least one electrically non-conductive layer sandwiched between the first and second electrically conductive layers, wherein the second electrically conductive layer is disposed at a greater depth than the first electrically conductive layer, wherein a first thickness of the first electrically conductive layer is less than a second thickness of the second electrically conductive layer.

11. The method of claim 9, wherein the first electrically conductive layer is an outermost layer on the part.

12. The method of claim 9, wherein the second electrically conductive layer is disposed at a greater depth than the first electrically conductive layer, wherein a first electrical conductivity of the first electrically conductive layer is greater than a second electrical conductivity of the second electrically conductive layer.

13. The method of claim 9, further comprising electrically coupling the multilayer coating with a condition-based monitoring system comprising: a voltmeter; an ammeter and a source of electrical potential; or combinations thereof, wherein the condition-based monitoring system is disposed electrically between the first and second electrically conductive layers.

14. A method of monitoring and diagnosing a condition of a coated part, the method comprising:

providing a coated part, the coated part including a base material having a multilayer coating thereon, wherein the multilayer coating comprises at least three layers including first and second electrically conductive layers;

measuring an electrical response between the first and second electrically conductive layers of the multilayer coating; and correlating the electrical response with a condition of the multilayer coating.

15. The method of claim 14, wherein measuring the electrical response includes:

electrically coupling a voltmeter with the first and second electrically conductive layers and measuring a voltage between the first and second electrically conductive layers of the multilayer coating;

electrically coupling an ammeter and a source of electrical potential with the first and second electrically conductive layers, generating a current across the multilayer coating, and measuring the current between the first and second electrically conductive layers of the multilayer coating; or combinations thereof.

16. The method of claim 15, wherein the measured voltage varies in response to the presence of a defect in the multilayer coating, wherein the measured current varies in response to the presence of a defect in the multilayer coating, or combinations thereof.

17. The apparatus of claim 16, wherein the defect is a scratch, a pit, a crevice, a crack, abrasive wear, erosion, fretting, or debonding.

18. The method of claim 15, further comprising continually or continuously varying voltage across the multilayer coating, continually or continuously varying current across the multilayer coating, or combinations thereof.

19. The method of claim 15, wherein:

if the measured voltage is below a threshold voltage, determining that the coated part has a surface that is suitable for deployment and service in an operational environment;

if the measured voltage is above the threshold voltage, maintaining the coated part, replacing the coated part, inspecting the coated part, or combinations thereof;

if the measured current is above a threshold current, determining that the coated part has a surface that is suitable for deployment and service in an operational environment; or if the measured current is below the threshold current, maintaining the coated part, replacing the coated part, inspecting the coated part, or combinations thereof.

20. The method of claim 14, further comprising, based upon the electrical response: determining whether a defect is forming in the multilayer coating; determining whether a defect is present in the multilayer coating; determining a degree of penetration of a defect into the multilayer coating; determining whether to pause or cease operations of the part; determining whether to recoat the part with an additional multilayer coating; determining whether to perform maintenance on the part; determining whether to replace the part; or combinations thereof.

* * * * *